(12) United States Patent
Sadovsky et al.

(10) Patent No.: US 8,489,604 B1
(45) Date of Patent: Jul. 16, 2013

(54) AUTOMATED RESOURCE SELECTION PROCESS EVALUATION

(75) Inventors: Adam Sadovsky, Mountain View, CA (US); Paul Haahr, San Francisco, CA (US); Trevor Strohman, Sunnyvale, CA (US); Per Bjornsson, Sunnyvale, CA (US); Jun Xu, Sunnyvale, CA (US); Gabriel Schine, San Francisco, CA (US); Jay Shrauner, San Francisco, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 12/912,229

(22) Filed: Oct. 26, 2010

(51) Int. Cl.
*G06F 7/00* (2006.01)
(52) U.S. Cl.
USPC ........... 707/737; 707/706; 707/707; 707/711; 707/741
(58) Field of Classification Search
USPC .......................... 707/706, 707, 711, 741, 737
See application file for complete search history.

(56) References Cited

U.S. PATENT DOCUMENTS

| | | | |
|---|---|---|---|
| 5,920,854 | A | 7/1999 | Kirsch et al. |
| 8,255,386 | B1 | 8/2012 | Annau et al. |
| 2004/0117367 | A1 | 6/2004 | Smith et al. |
| 2004/0186827 | A1 | 9/2004 | Anick et al. |
| 2005/0071465 | A1 | 3/2005 | Zeng et al. |
| 2006/0117002 | A1* | 6/2006 | Swen .................. 707/4 |
| 2006/0287993 | A1 | 12/2006 | Yao et al. |
| 2010/0257164 | A1* | 10/2010 | Halverson et al. ............ 707/725 |
| 2011/0022590 | A1* | 1/2011 | Yu .................. 707/728 |

OTHER PUBLICATIONS

U.S. Appl. No. 13/617,198, filed Sep. 14, 2012, Automated Resource Selection Process Evaluation, Adam Sadovsky et al.

* cited by examiner

*Primary Examiner* — Cindy Nguyen
(74) *Attorney, Agent, or Firm* — Fish & Richardson P.C.

(57) ABSTRACT

Methods, systems, and apparatus, including computer programs encoded on computer storage media, for evaluating resource selection processes. One method includes receiving test queries and generating a first group of resources corresponding to a first automated resource selection process and generating a second group of resources corresponding to a second automated resource selection process for each query. Another method includes generating a query results table for use in generating the groups of resources. The query results table maps queries to resources matched to the queries, and maps each resource to a respective score for the resource and the query, and one or more index selection signals for the resource.

31 Claims, 7 Drawing Sheets

AUTOMATED RESOURCE SELECTION PROCESS EVALUATION

BACKGROUND

This specification relates to evaluating automated resource selection processes for use by search engines.

Search engines, e.g., Internet search engines, provide information about resources (e.g., Web pages, images, text documents, multimedia content) that are responsive to a user's search query. Search engines return a set of search results (e.g., as a ranked list of results) in response to a user-submitted query. A search result includes, for example, a link (e.g., a URL) to, and a snippet of information from, a corresponding resource.

In order to identify the most responsive resources to a user's query, search engines build indexes that map words and phrases to resources determined to be relevant to the words and phrases. To build this index, search engines crawl available resources, e.g., by crawling the Internet. Index space is finite; therefore, search engines determine whether to include each resource that is crawled in the index. In some search engines, the determination of whether to include a particular resource in the search engine index is made according to an automated resource selection process. Automated resource selection processes analyze the values of one or more index selection signals for the resource to determine whether the resource should be included in the index. Each index signal is a metric of a quality of the resource derived by combining one or more attributes of a resource. Each index selection signal value is a quantity (generally scalar) derived from one or more attributes of the resource. Resource attributes can be internal to a resource, e.g., a number of words in a given resource or a length of the title of the given resource. Resource attributes can also be external to the resource, e.g., attributes derived from resources that link to a given resource or attributes derived from user behavior toward the resource.

To evaluate different resource selection processes, a system can build separate indexes and consider the indexes side by side, e.g., by comparing the resources identified by each index in response to various queries. However, this requires the overhead of building and maintaining two separate indexes, which can be costly.

Alternatively, a system can build a single index, where some resources are selected according to a first resource selection process and other resources are selected according to a different second resource selection process. User behavior toward the resources selected by the first resource selection process and user behavior toward the resources selected by the second resource process can then be observed. However, the user behavior data is incomplete, because it fails to account for how users would interact with the resources if only resources selected according to one of the resource selection processes were presented to users.

As yet another alternative, a system can observe user behavior regarding resources selected according to a single resource selection process. However, only observing behavior with regard to one index can give an incomplete picture of the quality of the index selection algorithm. User behavior data for resources not selected by the resource selection process being evaluated is not available, and therefore one cannot determine whether the selection algorithm could have done better.

SUMMARY

In general, one innovative aspect of the subject matter described in this specification can be embodied in methods that include the actions of receiving a plurality of test queries; generating, for each test query, a first group of resources corresponding to a first automated resource selection process and a second group of resources corresponding to a second automated resource selection process, the generating comprising, for each test query: identifying a plurality of resources responsive to the test query; determining, for each resource in the plurality of resources, whether the first automated resource selection process would classify the resource as to-be-indexed or not-to-be-indexed, and then selecting all resources classified as to-be-indexed as the first group of resources; determining, for each resource in the plurality of resources, whether the second automated resource selection process would classify the resource as to-be-indexed or not-to-be-indexed, and then selecting all resources classified as to-be-indexed as the second group of resources. Other embodiments of this aspect include corresponding systems, apparatus, and computer programs recorded on computer storage devices, each configured to perform the operations of the methods.

These and other embodiments can each optionally include one or more of the following features. The determination whether the first automated resource selection process would classify a resource as to-be-indexed or not-to-be-indexed is made independently of the determination made for any other identified resource. The determination whether the second automated resource selection process would classify a resource as to-be-indexed or not-to-be-indexed is made independently of the determination made for any other identified resource. The actions further comprise determining, for at least one test query, that the first automated resource selection process would classify at least one resource as to-be-indexed and would classify at least one resource as not-to-be-indexed. The actions further comprise determining, for at least one test query, that the second automated resource selection process would classify at least one resource as to-be-indexed and would classify at least one resource as not-to-be-indexed. For at least one of the test queries in the plurality of test queries, the first group of resources is different from the second group of resources.

Determining whether the first automated resource selection process would classify the resource as to-be-indexed or not-to-be-indexed comprises deriving an index selection score for the resource, determining that the first automated resource selection process would classify the resource as to-be-indexed if the index selection score satisfies a threshold, and otherwise determining that the first automated resource selection process would classify the resource as not-to-be-indexed. Identifying a plurality of resources responsive to the test query comprises identifying the plurality of resources from a query results table, wherein the query results table maps each of a plurality of queries to a respective one or more resources responsive to the query and includes a query-independent quality score for each resource.

The actions further comprise: receiving respective feedback for each test query, the respective feedback for each test query selecting either the first group of resources or the second group of resources; and selecting either the first automated resource selection process or the second automated resource selection process as a result of the respective feedback for each test query. The actions further comprise presenting first search results corresponding to the first group of resources and second search results corresponding to the second group of resources to each evaluator in a plurality of evaluators, wherein: receiving feedback selecting either the first group of resources or the second group of resources comprises receiving feedback from each evaluator indicating that the evaluator prefers the first search results or the second search results, and aggregating the received feedback. The actions further comprise obtaining a query-specific score for each resource in the first group of resources and obtaining a query-specific score for each resource in the second group of resources, wherein: the first search results corresponding to the first group of resources have a first order derived from the query-specific score for each resource and presenting the first search results comprises presenting the first search results according to the first order; and the second search results for the second group of resources have a second order derived from the query-specific score for each resource and presenting the second search results comprises presenting the second search results according to the second order. The actions further comprise for one or more of the test queries: receiving the test query through a search engine user interface from each of a plurality of users; presenting search results corresponding to the first group of resources to one or more first users in the plurality of users in response to receiving the test query from each first user, and presenting search results corresponding to the second group of resources to one or more second users in the plurality of users in response to receiving the test query from each second user; and comparing user assessment of the search results corresponding to the first group of resources and user assessment of search results corresponding to the second group of resources, resulting in a comparison; and analyzing the comparison for each of the one or more test queries to select either the first automated resource selection process or the second automated resource selection process. The operations further comprise obtaining a query-specific score for each resource in the first group of resources and obtaining a query-specific score for each resource in the second group of resources, wherein: the search results for the first subset of identified resources have a first order derived from the query-specific scores for each resource and presenting the search results comprises presenting the search results according to the first order; and the search results for the second subset of identified resources have a second order derived from the query-specific scores for each resource and presenting the search results comprises presenting the search results according to the second order.

In general, another innovative aspect of the subject matter described in this specification can be embodied in the methods that include the actions of storing data representing a plurality of index selection signals, wherein the index selection signals comprise a totality of signals used by each of a plurality of automated resource selection processes, wherein each automated resource selection process uses one or more of the plurality of types index selection signals to determine whether to include or exclude a resource from an index; selecting a plurality of queries for inclusion in a query results table; for each of a plurality of resources: matching one or more terms of the resource to each of one or more of the plurality of queries; determining a respective ranking score for the resource for each matched query; and obtaining one or more index selection signal values for each matched resource, wherein each obtained index selection signal value is for one of the index selection signals in the plurality of index selection signals; and generating the query results table, wherein the query results table maps each of the plurality of queries to each resource matched to the query, and maps each resource to a respective score for the resource and the query, and one or more index selection signals for the resource. Other embodiments of this aspect include corresponding systems, apparatus, and computer programs recorded on computer storage devices, each configured to perform the operations of the methods.

These and other embodiments can each optionally include one or more of the following features. The actions further comprise determining a ranking score threshold for each query; for each of the plurality of resources: matching one or more terms of the resource to each of one or more of the plurality of queries; for each matched query for the resource: determining an approximate ranking score for the resource for the matched query; comparing the approximate ranking score for the resource for the matched query to the ranking score threshold for the matched query; determining a final ranking score for the resource for the matched query if the approximate ranking score satisfies the ranking score threshold, and otherwise not determining a final ranking score for the resource and the matched query; and wherein the query results table maps each of the plurality of queries to any resource that matched the query and has a final ranking score that satisfies a threshold. Determining a ranking score threshold for each query comprises selecting a proper subset of the plurality of resources, and, for each resource in the proper subset matching one or more terms of the resource to each of one or more of the plurality of queries; and determining an approximate ranking score for the resource for each matched query; and determining a ranking score threshold for each query from the approximate ranking score for each resource matched to the query. Each type of index selection signal is derived from one or more resource attributes. The actions further include crawling a plurality of candidate resources to generate a search engine index and to identify the plurality of resources, wherein the plurality of resources includes at least one resource that is not in the search engine index.

Particular embodiments of the subject matter described in this specification can be implemented so as to realize one or more of the following advantages. Different automated resource selection processes can be evaluated without the overhead of building separate indexes for each resource selection process. This reduces cost and storage overhead compared to conventional systems. Experiments testing different resource selection processes can be prepared more quickly than under conventional approaches. Different automated resource selection processes can be evaluated for different groups of queries. Evaluation of automated resource selection processes can be automated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
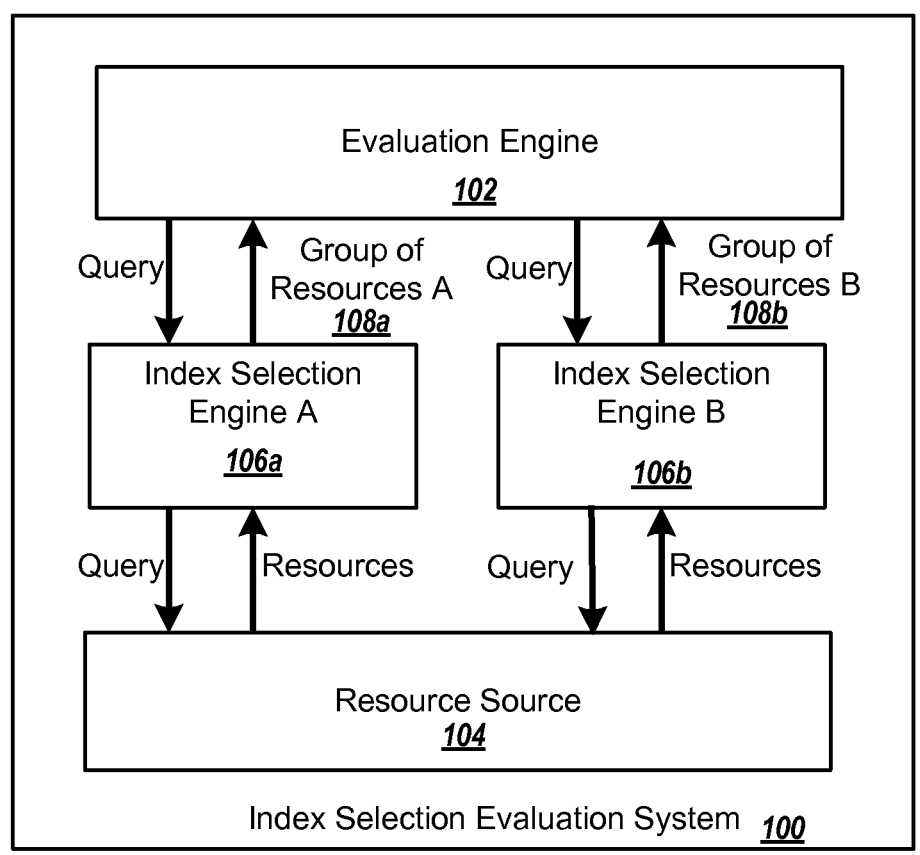
FIG. 1 is a block diagram of an example index selection evaluation system.

FIG. 1 is a block diagram of an example index selection evaluation system 100. The index selection evaluation system 100 includes an evaluation engine 102, a resource source 104, and one or more index selection engines 106a and 106b. While two index selection engines 106a and 106b are shown in FIG. 1, other numbers of index selection engines can alternatively be used. The index selection evaluation system 100 is implemented on one or more computers.

The evaluation engine 102 evaluates different automated resource selection processes. Each automated resource selection process determines whether individual resources should be included in an index of a search engine or should not be included in the index of the search engine. A resource is any data that can be provided by a website or other source, e.g., over a network or on a file system, and that is associated with a resource address or identifier, e.g., a Uniform Resource Locator (URL), a Uniform Resource Identifier (URI), or a file name. Examples of resources are HTML pages, word processing documents, portable document format (PDF) documents, presentation documents, images, videos, and feed sources. Each resource can include content, such as words, phrases, and pictures, and can include embedded information, e.g., meta information and hyperlinks, or embedded instructions, e.g., JavaScript scripts.

The evaluation engine 102 evaluates resource selection processes by comparing a group of resources for each process, for each of various queries. Each group of resources for a process and a query is the resources that the process would have included in an index and that are responsive to the query. For example, in the example illustrated in FIG. 1, the groups of resources for a query are the group of resources A 108a for automated resource selection process A and the group of resources B 108b for automated resource selection process B. Different methods for evaluating resource selection processes by comparing groups of resources are described in more detail below with reference to FIGS. 3-5.

The evaluation engine 102 obtains the groups of resources 108a and 108b for each automated resource selection process from index selection engines 106a and 106b. While a separate index selection engine for each automated selection process is shown in FIG. 1, in alternative implementations, multiple automated selection processes share the same index selection engine.

The index selection engines 106a and 106b generate the groups of resources as follows. Each index selection engine 106a and 106b receives a query from the evaluation engine, sends the query to the resource source 104, and receives resources responsive to the query, or data identifying the resources, from the resource source 104.

The resource source 104 stores data relating to resources, e.g., resources crawled to build a search engine index. The resource source 104 is configured to receive a query and return resources, or data identifying resources, responsive to the query. In some implementations, the resource source 102 is a query results table that maps queries to resources responsive to the queries and information about the resources. Example methods for building the resource source 104 are described in more detail below with reference to FIGS. 6-7.

Once the index selection engines 106a and 106b receive the resources, the index selection engines 106a and 106b classify each resource as one that would be included in a search engine index by their respective automated resource selection processes or as one that would not be included in the index by their respective automated resource selection processes. All resources that are classified as ones that would be included in the index by the automated resource selection process are sent to the evaluation engine 102 as a group of resources.

Figure 2:
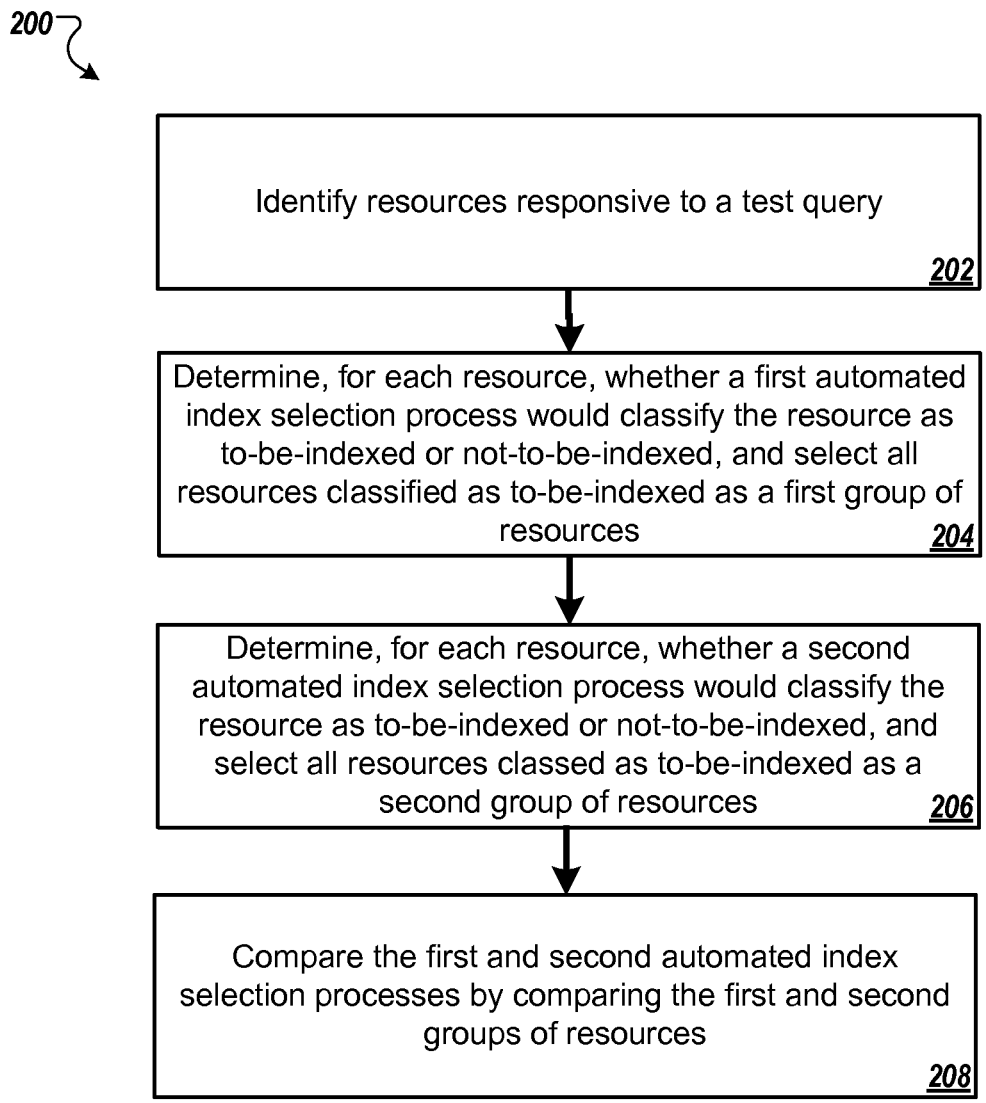
FIG. 2 is a flow chart of an example method for selecting groups of resources for use in comparing automated resource selection processes.

FIG. 2 is a flow chart of an example method 200 for selecting groups of resources for use in comparing automated resource selection processes. For convenience, the example method 200 is described in reference to a system of one or more computers that performs the method 200. The system can be, for example, the index selection evaluation system 100 described above with reference to FIG. 1.

The system identifies resources responsive to a test query (202), for example, by sending the test query to a resource source and receiving resources from the resource source. In some implementations, rather than receiving the resources themselves, the system receives data identifying and characterizing the resources. This data can include, for example, an identifier of each resource and one or more indexing signals describing the resource. Example indexing signals are the length of the resource, the words in the title of the resource, an identifier of the resource, the length of the body text of the resource, a query-independent quality score for the resource, and user selection information for the resource, for example, a click-through-rate for the resource. In general, the indexing signals are signals describing the resource itself, independent of any specific query that the resource might be responsive to. The indexing signals can be stored in a resource representation of each resource, can be extracted from the resources as needed, or can be retrieved from a lookup table that stores index signals for resources. Each indexing signal for a resource can be accessed through an application programming interface (API) that specifies a naming convention for the indexing signals.

The system determines, for each resource, whether a first automated resource selection process would classify the resource as to-be-indexed or as not-to-be-indexed, and selects all resources classified as to-be-indexed as a first group of resources (204). In some implementations, the determination of whether a given resource should be classified as to-be-indexed or not-to-be-indexed is made independently of the determinations made for any other resources. For example, the system can score each resource and compare the score to a threshold to determine the appropriate classification for the resource.

The system determines whether a first automated resource selection process would classify the resource as to-be-indexed or not-to-be-indexed by applying a heuristic associated with the first automated resource selection process. The heuristic corresponds to the formula the first automated resource selection process uses to generate scores for resources from signals describing the resources. This results in a single query-independent index selection score that is a summary of all of the signals used by the heuristic.

Each heuristic is specified by code that can be executed by the system. Each heuristic identifies the indexing signals it needs by invoking specific commands provided by an application programming interface (API). In some implementations, each heuristic is represented by a configuration file that identifies any parameters and formulas needed to generate the query-independent index selection score. A user can update the heuristics by editing the configuration file or editing any files that reference the configuration file and generate query-independent index selection scores.

The system compares the query-independent index selection score for each resource to a threshold. If the index selection score for the resource satisfies, e.g., exceeds, the threshold, the resource is classified as to-be-indexed. Otherwise, the resource is classified as not-to-be-indexed.

In some implementations, the threshold is a specified value that is associated with the first automated resource selection process. This value can be a fixed value.

Alternatively, the threshold can be determined based on the range of index selection scores calculated using the heuristic for the index selection process and the capacity of the index. For example, before the system selects resources for any particular query, the system, or another system, for example, a score generator made up of one or more computers that generate query-independent index selection scores, generates scores for a fixed percentage of the resources in the subset. For example, the system or the score generator can select a subset of the resources and generate a query-independent index selection score for each resource in the subset. From this, the system can estimate a score cutoff that will result in an index of the desired size. The size of the index can be measured in various ways. For example, the size can be the number of resources in the index or a resource cost of the resources in the index. An example resource cost is the physical storage space used to store data for the resources in the index. This resource cost can be estimated, for example, by a number of documents in the index or a number of tokens in the document. For example, the system can sort the subset of resources according to the query-independent index selection scores. The system can then start from the best-scoring resource and work down, adding each resource's size to a running total until the total is approximately equal to the desired size of the index times the fixed percentage. The system can then select the score for the last considered resource as the threshold value.

In some implementations, the system uses different thresholds for different types of resources. For example, the system can have different thresholds for resources in different languages.

For example, if the first automated resource selection process uses a query-independent quality score as the query-independent index selection score, and would include all resources with an query-independent quality score above a threshold in the index, the system can compare a query-independent quality score included in information received about each resource to the threshold, and classify resources whose query-independent quality score exceeds the threshold as to-be-indexed and resources whose query-independent quality score is less than or equal to the threshold as not-to-be-indexed.

The query-independent index selection score can be calculated according to a more complicated heuristic involving one or more signals and rules for adjusting the final index selection score based on signal values, for example, rules based on the number of characters in the resource, the number of links to the resource. For example, the system can start with a query-independent quality score for the resource, and then modify the score according to the following rules to obtain the final index selection score. If the identifier for the resource is longer than a pre-determined number of characters, the system multiplies the score by a first scoring factor. If the number of links to the resource from other resources is greater than a pre-defined number of links, the system multiplies the resulting score by a second scoring factor.

The system determines, for each resource, whether a second automated resource selection process would classify the resource as to-be-indexed or as not-to-be-indexed, and selects all resources classified as to-be-indexed as a second group of resources (206). The system makes the determination for the second automated resource selection process much as the system makes the determination for the first automated resource selection process.

In some implementations, the system caches the determination for one or more of the resources for the first automated resource selection process, the second automated resource selection process, or both automated resource selection processes. In these implementations, the system first checks the cache to see if a decision for a given resource is already stored before making the determination. If the decision is stored in the cache, the system uses the stored decision. Otherwise, the system makes the decision as described above.

The system compares the first and second automated resource selection processes by comparing the first and second groups of resources (208). Example methods for comparing the processes by comparing the groups of resources are described in more detail below with reference to FIGS. 3-5.

While the above description describes selecting groups of resources and comparing two automated resource selection processes, similar methods can be used to select groups of resources and compare more than two automated resource selection processes.

Figure 3:
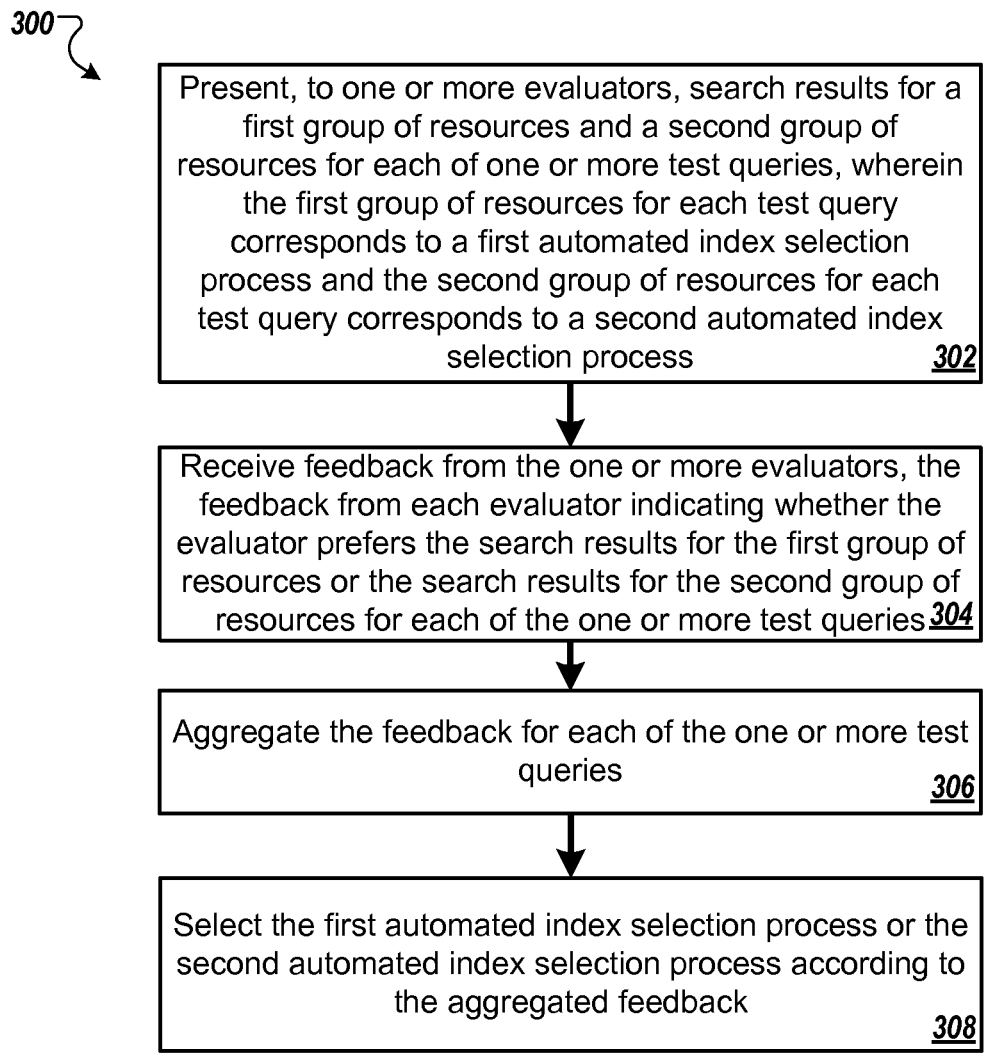
FIG. 3 is a flow chart of an example method for comparing automated resource selection processes by comparing search results for groups of resources associated with the automated resource selection processes.

FIG. 3 is a flow chart of an example method 300 for comparing automated resource selection processes by comparing groups of resources associated with the automated resource selection processes. For convenience, the example method 300 is described with reference to a system of one or more computers that performs the method. The system can be, for example, the index selection evaluation system 100 described above with reference to FIG. 1.

The system presents, to one or more evaluators, search results for a first group of resources and a second group of resources for each of one or more test queries (302). Each evaluator is a human being that views the two groups of resources and provides feedback on which group of resources the evaluator thinks is better. Each evaluator can make his or her decision based on specified factors or can make his or her decision based on personal, subjective feelings about the relative quality of the resources. In some implementations, all of the evaluators evaluate search results corresponding to each of the one or more test queries. In other implementations, at least some evaluators evaluate search results for less than all of the one or more test queries.

In other implementations, rather than using human evaluators, the system automatically evaluates the resources according to one or more predefined heuristics. For example, for each query, the system can identify the top ten resources according to a quality score for the resources. The system then evaluates each group of resources for the query by calculating the percentage of the top ten resources that are included in the group of resources selected for each resource selection process.

The first group of resources for each test query corresponds to a first automated resource selection process, and the second group of resources for each test query corresponds to a second automated resource selection process. The first groups of resources and the second groups of resources can be selected, for example, as described above with reference to FIG. 2.

The system presents the resources by presenting search results corresponding to the resources, e.g., in a user interface presented to each evaluator. Each search result presents information about a resource. For example, each search result can include a title of the resource, a URL that is an address of the resource, and an excerpt extracted from the resource.

In some implementations, the system determines an order for the resources and presents the search results according to the order. For example, the order can be the order that a search engine would use when presenting the search results to a user. The system can determine the order by instructing the search engine to determine a query-specific score for each resource before the resources are presented for a given query, and then ranking the search results according to the query-specific scores for the resources. Alternatively, the query-specific scores for the resources and each of a group of queries can be pre-computed by the search engine, e.g., at the time a resource source, such as a query results table, is constructed, and stored along with the resources identified for each query in the resource source.

In some implementations, the system presents search results corresponding to all of the resources in first group of resources and corresponding to all of the resources in second group of resources. In other implementations, the system presents search results corresponding to a proper subset of those resources. For example, the system can present search results corresponding to the top ten resources (or a different number of resources) in the first group of resources and search results corresponding to the top ten resources (or a different number of resources) in the second group of resources, according to the order for the first group of resources and the order for the second group of resources.

The system presents the search results in a manner that distinguishes the search results corresponding to the first group of resources from the search results corresponding to the second group of resources. For example, the search results can be presented side-by-side, where the search results corresponding to the first group of resources are on one side of a display and the search results corresponding to the second group of resources are on the other side of the display. An example of this type of presentation is described in more detail below, with reference to FIG. 4. As another example, the system can label the presentation of each search result, and use labels of one type for search results corresponding to resources in the first group of resources and labels of a different, second type for search results corresponding to resources in the second group of resources.

The system receives feedback from the one or more evaluators (304). The feedback from an evaluator indicates whether the evaluator prefers the search results corresponding to the first set of resources or the search results corresponding to the second set of resources for each of one or more test queries. The feedback can optionally include an indication of how much the evaluator prefers the first set of search results or the second set of search results. For example, each evaluator can provide a rating for the preferred set of search results. Each evaluator provides his or her feedback, for example, through an evaluation user interface. An example evaluation user interface is described in more detail below with reference to FIG. 4.

The system aggregates the feedback for each of the one or more test queries (306). The system aggregates the feedback to combine feedback received from multiple evaluators. For example, if the evaluation only indicates which set of search results was preferred, and six evaluators selected the first set of search results and two evaluators selected the second set of search results for a given test query, the system could count the number of selections of each set of search results, e.g., six and two, respectively. As another example, if the feedback includes a rating indicating how much a given set of search results was preferred, the system can sum the ratings for each set of search results. In other implementations, conventional statistical techniques are used to aggregate the ratings for the sets of search results.

The system selects the first automated resource selection process or the second automated resource selection process according to the aggregated feedback (308). The system can make this selection according to various heuristics. In some implementations, the system aggregates the feedback across all test queries, and compares the aggregated feedback for the automated resource selection processes that are being tested. The system then selects the automated resource selection process having the highest aggregated feedback across all queries.

In other implementations, the system determines a first number of test queries for which the number of evaluators that preferred the first set of search results exceeds the number of evaluators that preferred the second set of search results. The system also determines a second number of test queries for which the number of evaluators that selected the second set of search results exceeds the number of evaluators that selected the first set of search results. The system then compares the first number to the second number. If the first number exceeds the second number, the system selects the first automated index selection algorithm. If the second number exceeds the first number, the system selects the second automated index selection algorithm.

The numbers can optionally be weighted by the indication of how much more the evaluators preferred the search results. For example, if five evaluators preferred groups of resources for resource selection process A over groups of resources for resources selection process B by a rating of one, and three evaluators preferred groups of resources for resource selection process B over groups of resources for resource selection process A by a rating of three, the system could use 5×1=5 as the score for resource selection process A, could use 3×3=9 as the score for resource selection process B, and could select process B over process A as a result of the scores.

In some implementations, the system further considers other factors when selecting one of the resource selection processes over the other. For example, the system can consider the cost of evaluating each resource according to the heuristic associated with the resource selection process.

While the above description describes comparing two automated resource selection processes, similar methods can be used to compare more than two automated resource selection processes.

Figure 4:
FIG. 4 illustrates an example graphical user interface for presenting two sets of search results in response to the same query.

FIG. 4 illustrates an example graphical user interface for presenting two sets of search results 406 and 408 in response to the same query. The search results 406 and 408 correspond to resources that are selected according to two different automated resource selection processes. The user interface shown in FIG. 4 can be used, for example, to present sets of search results corresponding to resources selected according to different automated resource selection processes to evaluators and to receive feedback from the evaluators.

As shown in FIG. 4, two sets of search results are presented in response to the query "San Francisco Vacation" 402. The first set 406, includes search results corresponding to resources selected according to a first automated resource selection process. The second set 408 includes search results corresponding to resources selected according to a second automated resource selection process. The search results in both sets 406 and 408 are ordered according to an order that is the order a search engine would assign to the resources.

An evaluator can select one set of search results over the other by dragging (e.g., with a mouse or other input device) the slider bar 410 between the left side of the display and the right side of the display. The evaluator indicates how much better one set of search results is as compared to the other set of search results by how far to the left or right he or she drags the slider bar.

While the above description describes a user interface for comparing two automated resource selection processes, similar user interfaces can be used to receive feedback comparing more than two automated resource selection processes.

Figure 5:
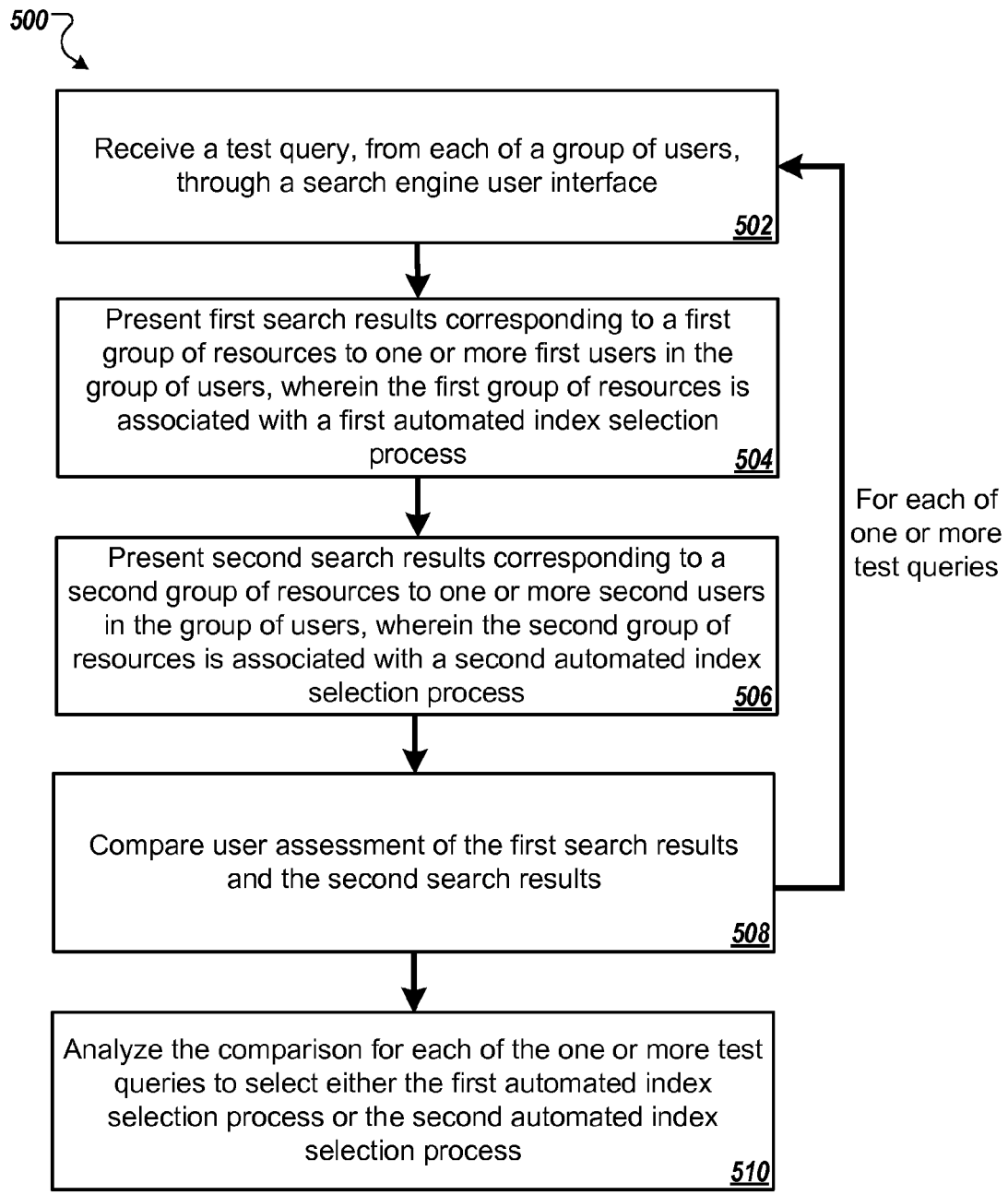
FIG. 5 is a flow chart of an example method for comparing automated resource selection processes by comparing user selections of search results corresponding to different groups of resources associated with the automated resource selection processes.

FIG. 5 is a flow chart of an example method 500 for comparing automated resource selection processes by comparing user selections of search results corresponding to different groups of resources associated with the automated resource selection processes. For convenience, the example method 500 is described with reference to a system of one or more computers that performs the method. The system can be, for example, the index selection evaluation system 100 described above with reference to FIG. 1.

The system performs the following steps for each of one or more test queries to collect data comparing user assessment of resources selected according to a first automated resource selection process with user assessment of resources selected according to a second automated resource selection process.

The system receives a test query, from each of a group of users, through a search engine user interface (502).

The system presents first search results corresponding to a first group of resources to one or more first users in the group of users (504). The first group of resources is associated with a first automated resource selection process. The first group of resources can be identified, for example, as described above with reference to FIG. 2.

The system presents second search results corresponding to a second group of resources to one or more second users in the group of users (506). The second group of resources can be identified, for example, as described above with reference to FIG. 2.

In some implementations, the system presents the first search results and the second search results in an order corresponding to an order they would be assigned by a search engine. The system can determine the order, for example, as described above with reference to FIG. 4.

The first users and the second users are different. The system can decide whether a given user is in the first group or users or the second group of users according to conventional experiment techniques. For example, the system can use one or more heuristics to make this determination. In some implementations, the system randomly selects users as being in the first group or the second group. In other implementations, the system selects users in one physical location as the first group of users and users in a second different physical location as the second group of users.

In some implementations, each user that issues one of the test queries is classified as either a first user or a second user. In other implementations, fewer than all of the users that issue one of the test queries are classified as either a first user or a second user. For example, the system can classify a first percentage of the users as first users and can classify a second percentage of the users as second users. The rest of the users can be shown default search results.

The system compares user assessment of the first search results and the second search results (508). The user assessment can take different forms. In some implementations, the system measures the user assessment by an aggregate click-through-rate for the search results. The click-through-rate for each individual search result can be calculated, for example, as follows:

$$\frac{\text{number of times search result selected}}{\text{number of times search result presented to users}}.$$

The system determines the aggregate click-through-rate for search results corresponding to a group of resources by summing the click-through-rates for each individual search result. Other techniques for determining an aggregate click-through-rate, for example, averaging, can also be used.

In other implementations, the system measures the user assessment by a length of time a user indicates interest in search results for the resources, e.g., by hovering a mouse or other input cursor over a search result, or by viewing the resource itself.

Once the system collects the comparisons for each of the one or more test queries, the system analyzes the comparisons for each of the one or more test queries to select either the first automated resource selection process or the second automated resource selection process. The system can use conventional statistical techniques to determine which resource selection process was preferred by the users. For example, the system can aggregate the click-through-rates for the search result corresponding to each group of resources selected using the first resource selection process to obtain an overall click-through-rate for the first resource selection process and can aggregate the click-through-rates for the search results corresponding to each group of resources selected using the second resource selection process to obtain an overall click-through-rate for the second resource selection process, and then select the resource selection process with the higher overall click-through-rate. Similar techniques of aggregating and comparing can be used for other types of user assessment. For example, if user assessment is measured by the length of time a user views a resource, the system can aggregate or average the length of time for resources selected using the first resource selection process and can aggregate or average the length of time for resources selected using the second resource selection process.

In some implementations, the system considers other factors in addition to the comparison of the user assessment, for example, as described in more detail above with reference to FIG. 4.

While the above description describes comparing two automated resource selection processes, similar methods can be used to compare more than two automated resource selection processes.

Figure 6:
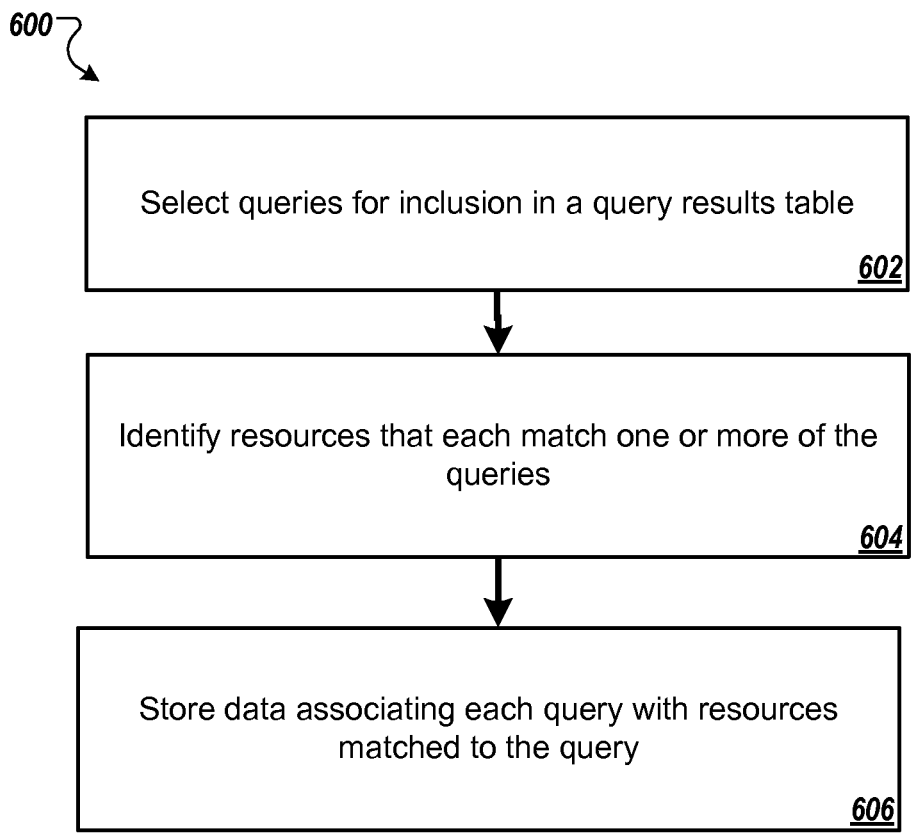
FIG. 6 is a flow chart of an example method for generating a resource source that associates queries with resources responsive to the queries.

FIG. 6 is a flow chart of an example method 600 for generating a resource source that associates queries with resources responsive to the queries. For convenience, the example method 600 will be described in reference to a system of one or more computers that performs the process. The system can be, for example, the index selection evaluation system 100 described above with reference to FIG. 1, or a different system.

The system selects queries for inclusion in a query results table (602). In some implementations the system uses a heuristic to select queries from a group of candidate queries. For example, the candidate queries can be all queries submitted by users to a search engine during a given time period, e.g., over the last three months. The system can then select queries from the group of candidate queries according to a selection heuristic. For example, the system can randomly select queries, or can focus on rare queries by selecting queries that are submitted less than a threshold number of times by users. In some implementations, the system selects the queries so that a pre-determined number of queries from each of one or more locales are selected. A locale is, for example, a country, a language, or a country and a language pair. In some implementations, the system receives the sampled queries from another system that samples query logs. In other implementations, the system directly samples query logs. The query log data is maintained in anonymized form to protect user privacy. This does not affect the operations of the system. In implementations where the system directly samples the query logs, the system preferably takes actions to anonymize the query log data and protect user privacy. In some implementations, the system samples the query logs using programs implemented with a MapReduce framework and programming model. For example, the system can use a map step that processes the logs and outputs queries keyed by locale. The reduce step can then sample a pre-determined number N of queries from each locale using conventional statistical sampling techniques.

In other implementations the system uses people to select, or help select, queries. For example, a person or group of people can select the set of queries and instruct the system to use the selected queries. In some implementations, queries are selected that are expected to have a small number of matching resources, e.g., a number of resources that can be accommodated by the storage space allocated to the resource source.

In still other implementations, the system uses a combination of heuristic query selection and human intervention to select the queries.

The system identifies resources that match one or more of the queries (604). The resources can be, for example, resources crawled by a search engine as part of the process of building a search engine index that have terms that match the terms of one or more of the queries. The system can identify the resources as they are being crawled, or can alternatively process data collected for the resources during the crawling process after the crawling process has been completed.

In some implementations, the system considers all resources crawled by the search engine. In other implementations, the system considers all resources crawled by the search engine up to a predetermined depth. The depth can be selected to be deeper than the depth usually used when the search engine is building an index. When the selected depth is deeper than the depth used when the search engine is building an index, the system identifies resources that the search engine does not include in its index.

The system determines if a given resource matches a given query by determining if one or more terms, e.g., words or phrases, in the query appear in the resource. In some implementations, the system modifies each query, for example, through stemming, normalization, adding synonyms, or other techniques, and tries to match the resource to the modified query rather than the original query. In general, the system performs the same query modifications that the search engine for which the automated index selection algorithms are being tested would perform.

In some implementations, the system also obtains a query-specific score for each resource for each query matched to the resource, for example, by requesting a query-specific score for the resource and the matched query from the search engine for which the automated resource selection processes are being tested. The query-specific score can later be used to rank resources responsive to a query, for example, as described above with reference to FIG. 3.

In some implementations, rather than obtaining a query-specific score for each resource for each query matched to the resource, the system only obtains a query-specific score for a resource for a given query when the resource is estimated to have a good query-specific score for the given query, e.g., estimated to have a query-specific score that satisfies a score threshold. An example method for determining which matches are estimated to have a good query-specific score is described in more detail below with reference to FIG. 7.

The system stores data associating each query with resources matched to the query (606). In implementations where the system determined a query-specific score for each resource for each matched query, the system associates each query with each matched resource and the query-specific score for the resource. In implementations where the system only determined a query-specific score for some of the matched resources and queries, the system only associates the queries with resources that were scored for the queries.

In some implementations, the system assigns an order to the resources matching each query according to the associated query-specific scores for the resources and the query.

In some implementations, the system identifies index selection signals for inclusion in the resource source. Each index selection signal is derived from one or more resource attributes. The identified index selection signals include all signals used by any of the resource selection processes that may be tested. In such implementations, the system can obtain index selection signal values for each resource and store the obtained index signal values along with the data associating each query with all matching resources. The index selection values can be obtained, for example, by accessing code referenced through the application programming interface (API) for index selection signals.

While the above describes a single resource source, the resource source can be structured in various ways. For example, the resource source can be multiple tables that are stored on multiple machines. Each table can correspond to a portion of the data. As another example, the index selection signals can be stored separately from the query-specific ranking scores for each document.

Figure 7:
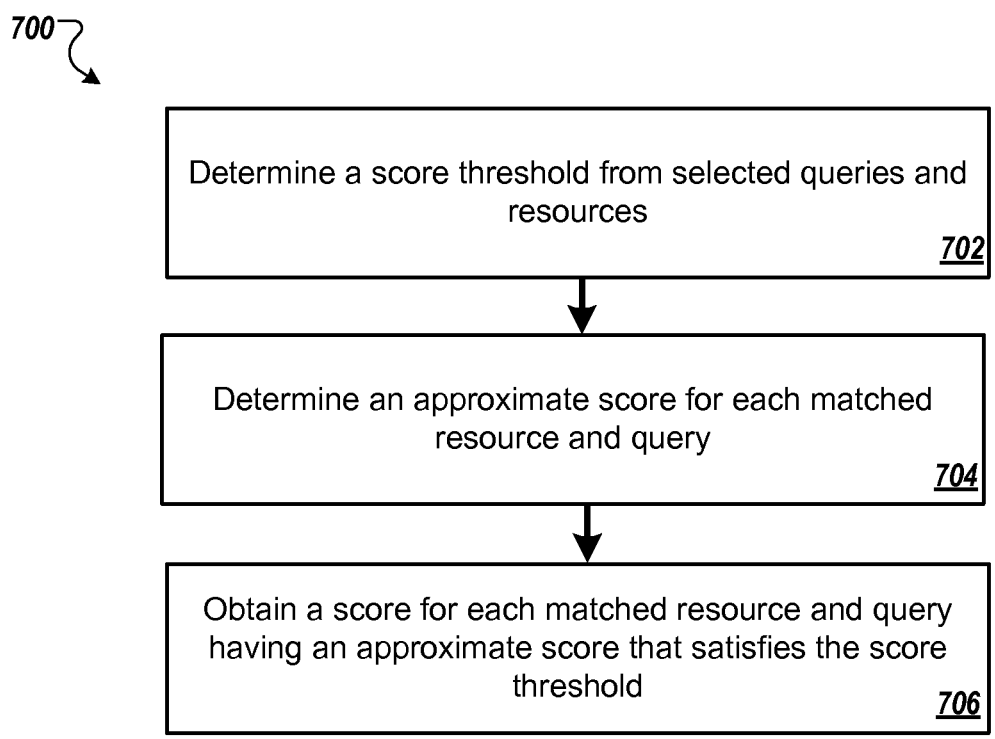
FIG. 7 is a flow chart of an example method for determining whether to obtain a query specific score for a matched resource and query.

FIG. 7 is a flow chart of an example method 700 for determining whether to obtain a query-specific score for a matched resource and query, and then obtaining the query-specific score when appropriate. For convenience, the example method 700 will be described in reference to a system of one or more computers that performs the process. The system can be, for example, the index selection evaluation system 100 described above with reference to FIG. 1, or a different system.

The system determines a score threshold from selected queries and resources (702). The selected queries can be selected, for example, as described above with reference to FIG. 6. The resources are the resources being considered for inclusion in the resource source.

In some implementations, the system obtains the score threshold as follows. First, the system matches a proper subset of the resources, e.g., 1% of the resources, against all of the selected queries. The system selects this subset, for example, using random sampling. The system then obtains a query-specific score for each resource for each query matched to the resource, for example, as described above with reference to FIG. 6. The system then uses the obtained query-specific scores to calculate the score threshold.

The system selects the score threshold according to the obtained query-specific scores and an amount of storage space allocated to the resource source. The system uses the subset of the resources as a sample of the entire population of resources, and selects the threshold accordingly. For example, if the system is trying to select N resources for each query, and the matched and scored subset of the resources is x percent of the total resources that match the query, the system identifies a threshold that would result in keeping matching resources having a total size of $$\frac{N \times x}{100}.$$

The system ranks the matches of resources and queries according to their query-specific scores for each query, identifies the resource and matched query that would result in a size of approximately $$\frac{N \times x}{100},$$

, and uses the query-specific score of the identified resource for the identified query as the score threshold.

The system determines an approximate score for each matched resource and query (704). The approximate score is calculated according to a heuristic designed to approximate the actual query-dependent score for the resource, but with less computational overhead. For example, the algorithms used to generate the approximate score can be optimized for the comparison of one query to many documents. In some implementations, the algorithms are selected to give a conservatively high estimate of the score that the full scoring function will assign.

The system obtains a score for each matched resource and query having an approximate score that satisfies the score threshold (706). The system can obtain the score, for example, as described above with reference to FIG. 6.

In some implementations, the system selects the threshold and performs the matching and scoring of the resources using programs implemented with a MapReduce framework and programming model.

For example, in some implementations, the system determines the threshold as follows. The system performs a map step that loads the queries into memory and processes the subset of resources one at a time. For each resource, the map step finds all matching queries and estimates a score for each matched resource and query, as described above. The output of the map step is the query mapped to the estimated scores for each resource matched to the query. The system then performs a reduce step that sorts the resources for each query by the estimated scores and identifies the appropriate threshold as described above.

In some implementations, the system performs the matching and scoring to build the full resource source as follows. The system first performs a map step that loads all queries into memory and processes one resource at a time. For each resource, the system identifies all matching queries, calculates the score estimate for each query, and if the score estimate is above a threshold, calculates the full score for the query and the resource. The map step outputs queries mapped to resources and full scores, along with any data needed to return search results to users. The reduce step then sorts the resources for each query by score.

The system then performs a second map reduce that associates any needed index selection signal values with each resource. The map reduce for generating the full resource source can be split into multiple map reduces for different resources. In such implementations, the second map reduce can also merge the results from the multiple map reduces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers configured to perform operations comprising:
   receiving a plurality of test queries;
   generating, for each test query, a first group of resources corresponding to a first automated resource selection process and a second group of resources corresponding to a second automated resource selection process, the generating comprising, for each test query:
   identifying a plurality of resources responsive to the test query,
   determining, for each resource in the plurality of resources, whether the first automated resource selection process would classify the resource as to-be-indexed or not-to-be-indexed, and then selecting all resources classified as to-be-indexed as the first group of resources, and
   determining, for each resource in the plurality of resources, whether the second automated resource selection process would classify the resource as to-be-indexed or not-to-be-indexed, and then selecting all resources classified as to-be-indexed as the second group of resources,
   wherein the determination whether the first automated resource selection process would classify a particular resource as to-be-indexed or not-to-be-indexed is made independently of the determination whether the second automated resource selection process would classify that particular resource as to-be-indexed or not-to-be-indexed.

2. The system of claim 1, wherein the determination whether the first automated resource selection process would classify any particular resource as to-be-indexed or not-to-be-indexed is made independently of the determination made for any other identified resource.

3. The system of claim 1, wherein the determination whether the second automated resource selection process would classify any particular resource as to-be-indexed or not-to-be-indexed is made independently of the determination made for any other identified resource.

4. The system of claim 1, wherein the operations further comprise determining, for at least one test query, that the first automated resource selection process would classify at least one resource as to-be-indexed and would classify at least one resource as not-to-be-indexed.

5. The system of claim 1, wherein the operations further comprise determining, for at least one test query, that the second automated resource selection process would classify at least one resource as to-be-indexed and would classify at least one resource as not-to-be-indexed.

6. The system of claim 1, wherein, for at least one of the test queries in the plurality of test queries, the first group of resources is different from the second group of resources.

7. The system of claim 1, wherein determining whether the first automated resource selection process would classify the resource as to-be-indexed or not-to-be-indexed comprises deriving an index selection score for the resource, determining that the first automated resource selection process would classify the resource as to-be-indexed if the index selection score satisfies a threshold, and otherwise determining that the first automated resource selection process would classify the resource as not-to-be-indexed.

8. The system of claim 1, wherein identifying a plurality of resources responsive to the test query comprises identifying the plurality of resources from a query results table, wherein the query results table maps each of a plurality of queries to a respective one or more resources responsive to the query and includes a query independent quality score for each resource.

9. The system of claim 1, wherein the operations further comprise:
    receiving respective feedback for each test query, the respective feedback for each test query selecting either the first group of resources or the second group of resources; and
    selecting either the first automated resource selection process or the second automated resource selection process as a result of the respective feedback for each test query.

10. The system of claim 9, wherein the operations further comprise presenting first search results corresponding to the first group of resources and second search results corresponding to the second group of resources to each evaluator in a plurality of evaluators, wherein:
    receiving feedback selecting either the first group of resources or the second group of resources comprises receiving feedback from each evaluator indicating that the evaluator prefers the first search results or the second search results, and aggregating the received feedback.

11. The system of claim 10, wherein the operations further comprise obtaining a query-specific score for each resource in the first group of resources and obtaining a query-specific score for each resource in the second group of resources, wherein:
    the first search results corresponding to the first group of resources have a first order derived from the query-specific score for each resource and presenting the first search results comprises presenting the first search results according to the first order; and
    the second search results corresponding to the second group of resources have a second order derived from the query-specific score for each resource and presenting the second search results comprises presenting the second search results according to the second order.

12. The system of claim 1, wherein the operations further comprise:
    for one or more of the test queries:
        receiving the test query through a search engine user interface from each of a plurality of users;
        presenting search results corresponding to the first group of resources to one or more first users in the plurality of users in response to receiving the test query from each first user, and presenting search results corresponding to the second group of resources to one or more second users in the plurality of users in response to receiving the test query from each second user; and
        comparing user assessment of the search results corresponding to the first group of resources and user assessment of search results corresponding to the second group of resources, resulting in a comparison; and
    analyzing the comparison for each of the one or more test queries to select either the first automated resource selection process or the second automated resource selection process.

13. The system of claim 12, wherein the operations further comprise obtaining a query-specific score for each resource in the first group of resources and obtaining a query-specific score for each resource in the second group of resources, wherein:
    the search results for a first subset of identified resources have a first order derived from the query-specific scores for each resource and presenting the search results comprises presenting the search results according to the first order; and
    the search results for a second subset of identified resources have a second order derived from the query-specific scores for each resource and presenting the search results comprises presenting the search results according to the second order.

14. A computer-implemented method, comprising:
    receiving a plurality of test queries;
    generating, for each test query, a first group of resources corresponding to a first automated resource selection process and a second group of resources corresponding to a second automated resource selection process, the generating comprising, for each test query:
        identifying a plurality of resources responsive to the test query,
        determining, for each resource in the plurality of resources, whether the first automated resource selection process would classify the resource as to-be-indexed or not-to-be-indexed, and then selecting all resources classified as to-be-indexed as the first group of resources, and
        determining, for each resource in the plurality of resources, whether the second automated resource selection process would classify the resource as to-be-indexed or not-to-be-indexed, and then selecting all resources classified as to-be-indexed as the second group of resources,
    wherein the determination whether the first automated resource selection process would classify a particular resource as to-be-indexed or not-to-be-indexed is made independently of the determination whether the second automated resource selection process would classify that particular resource as to-be-indexed or not-to-be-indexed.

15. The method of claim 14, wherein the determination whether the first automated resource selection process would classify any particular resource as to-be-indexed or not-tobe-indexed is made independently of the determination made for any other identified resource.

16. The method of claim 14, wherein the determination whether the second automated resource selection process would classify any particular resource as to-be-indexed or not-to-be-indexed is made independently of the determination made for any other identified resource.

17. The method of claim 14, further comprising:
   determining, for at least one test query, that the first automated resource selection process would classify at least one resource as to-be-indexed and would classify at least one resource as not-to-be-indexed.

18. The method of claim 14, further comprising:
   determining, for at least one test query, that the second automated resource selection process would classify at least one resource as to-be-indexed and would classify at least one resource as not-to-be-indexed.

19. The method of claim 14, wherein, for at least one of the test queries in the plurality of test queries, the first group of resources is different from the second group of resources.

20. The method of claim 14, wherein determining whether the first automated resource selection process would classify the resource as to-be-indexed or not-to-be-indexed comprises deriving an index selection score for the resource, determining that the first automated resource selection process would classify the resource as to be indexed if the index selection score satisfies a threshold, and otherwise determining that the first automated resource selection process would classify the resource as not-to-be-indexed.

21. The method of claim 14, wherein identifying a plurality of resources responsive to the test query comprises identifying the plurality of resources from a query results table, wherein the query results table maps each of a plurality of queries to a respective one or more resources responsive to the query and includes a query independent quality score for each resource.

22. The method of claim 14, further comprising:
   receiving respective feedback for each test query, the respective feedback for each test query selecting either the first group of resources or the second group of resources; and
   selecting either the first automated resource selection process or the second automated resource selection process as a result of the respective feedback for each test query.

23. The method of claim 22, further comprising presenting first search results corresponding to the first group of resources and second search results corresponding to the second group of resources to each evaluator in a plurality of evaluators, wherein:
   receiving feedback selecting either the first group of resources or the second group of resources comprises receiving feedback from each evaluator indicating that the evaluator prefers the first search results or the second search results, and aggregating the received feedback.

24. The method of claim 23, further comprising obtaining a query specific score for each resource in the first group of resources and obtaining a query specific score for each resource in the second group of resources, wherein:
   the first search results corresponding to the first group of resources have a first order derived from the query specific score for each resource and presenting the first search results comprises presenting the first search results according to the first order; and
   the second search results corresponding to the second group of resources have a second order derived from the query specific score for each resource and presenting the second search results comprises presenting the second search results according to the second order.

25. The method of claim 14, further comprising:
   for one or more of the test queries:
      receiving the test query through a search engine user interface from each of a plurality of users;
      presenting search results corresponding to the first group of resources to one or more first users in the plurality of users in response to receiving the test query from each first user, and presenting search results corresponding to the second group of resources to one or more second users in the plurality of users in response to receiving the test query from each second user; and
      comparing user assessment of the search results corresponding to the first group of resources and user assessment of search results corresponding to the second group of resources, resulting in a comparison; and
   analyzing the comparison for each of the one or more test queries to select either the first automated resource selection process or the second automated resource selection process.

26. The method of claim 25, further comprising obtaining a query specific score for each resource in the first group of resources and obtaining a query specific score for each resource in the second group of resources, wherein:
   the search results for the a first subset of identified resources have a first order derived from the query specific scores for each resource and presenting the search results comprises presenting the search results according to the first order; and
   the search results for the a second subset of identified resources have a second order derived from the query specific scores for each resource and presenting the search results comprises presenting the search results according to the second order.

27. A computer storage medium encoded with a computer program, the program comprising instructions that when executed by data processing apparatus cause the data processing apparatus to perform operations comprising:
   receiving a plurality of test queries;
   generating, for each test query, a first group of resources corresponding to a first automated resource selection process and a second group of resources corresponding to a second automated resource selection process, the generating comprising, for each test query:
   identifying a plurality of resources responsive to the test query,
   determining, for each resource in the plurality of resources, whether the first automated resource selection process would classify the resource as to-be-indexed or not-to-be-indexed, and then selecting all resources classified as to-be-indexed as the first group of resources, and
   determining, for each resource in the plurality of resources, whether the second automated resource selection process would classify the resource as to-be-indexed or not-to-be-indexed, and then selecting all resources classified as to-be-indexed as the second group of resources,
   wherein the determination whether the first automated resource selection process would classify a particular resource as to-be-indexed or not-to-be-indexed is made independently of the determination whether the second automated resource selection process would classify that particular resource as to-be-indexed or not-to-be-indexed.

28. A system comprising:
one or more computers configured to perform operations comprising:
receiving a plurality of test queries;
selecting, for each test query, a first group of resources corresponding to a first automated resource selection process and a second group of resources corresponding to a second automated resource selection process, the selecting comprising, for each test query:
identifying a plurality of resources responsive to the test query,
determining, for each resource in the plurality of resources, whether the first automated resource selection process would classify the resource as to-be-indexed or not-to-be-indexed, and then selecting all resources classified as to-be-indexed as the first group of resources, and
determining, for each resource in the plurality of resources, whether the second automated resource selection process would classify the resource as to-be-indexed or not-to-be-indexed, and then selecting all resources classified as to-be-indexed as the second group of resources;
obtaining a respective query-specific score for each resource in the first group of resources and each resource in the second group of resources;
presenting for comparison by a user first search results for a first subset of the first group of resources and second search results for a second subset of the second group of resources, wherein the first search results are presented in an order derived from the respective query-specific scores for the resources in the first subset and the second search results are presented in an order derived from the respective query-specific scores for the resources in the second subset.

29. The system of claim 28, wherein the operations further comprise:
comparing an assessment of the first search results by the user and an assessment of the second search results by the user; and
selecting either the first automated search process or the second automated search process based on a result of the comparing.

30. A method comprising:
receiving a plurality of test queries;
selecting, for each test query, a first group of resources corresponding to a first automated resource selection process and a second group of resources corresponding to a second automated resource selection process, the selecting comprising, for each test query:
identifying a plurality of resources responsive to the test query,
determining, for each resource in the plurality of resources, whether the first automated resource selection process would classify the resource as to be indexed or not to be indexed, and then selecting all resources classified as to be indexed as the first group of resources, and
determining, for each resource in the plurality of resources, whether the second automated resource selection process would classify the resource as to be indexed or not to be indexed, and then selecting all resources classified as to be indexed as the second group of resources;
obtaining a respective query specific score for each resource in the first group of resources and each resource in the second group of resources;
presenting for comparison by a user first search results for a first subset of the first group of resources and second search results for a second subset of the second group of resources, wherein the first search results are presented in an order derived from the respective query specific scores for the resources in the first subset and the second search results are presented in an order derived from the respective query specific scores for the resources in the second subset.

31. The method of claim 30, further comprising:
comparing an assessment of the first search results by the user and an assessment of the second search results by the user; and
selecting either the first automated search process or the second automated search process based on a result of the comparing.

* * * * *

UNITED STATES PATENT AND TRADEMARK OFFICE
CERTIFICATE OF CORRECTION

PATENT NO. : 8,489,604 B1
APPLICATION NO. : 12/912229
DATED : July 16, 2013
INVENTOR(S) : Adam Sadovsky Page 1 of 1

It is certified that error appears in the above-identified patent and that said Letters Patent is hereby corrected as shown below:

In the Claims

Column 22, line 27, Claim 26, delete "the a" and insert therefor -- a --; and

Column 22, line 32, Claim 26, delete "the a" and insert therefor -- a --.

Signed and Sealed this
First Day of October, 2013

Teresa Stanek Rea
*Deputy Director of the United States Patent and Trademark Office*